(12) United States Patent
Mostaert et al.

(10) Patent No.: US 12,443,801 B2
(45) Date of Patent: Oct. 14, 2025

(54) ADAPTIVE TEMPLATE SYSTEM FOR FACILITATING CASE FILE SUFFICIENCY IN EVOLVING DOMAINS

(71) Applicant: MOTOROLA SOLUTIONS, INC., Chicago, IL (US)

(72) Inventors: Richard Mostaert, Crystal Lake, IL (US); Luke Young, Temecula, CA (US); Isabel Firpo, Chicago, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 461 days.

(21) Appl. No.: 17/644,956

(22) Filed: Dec. 17, 2021

(65) Prior Publication Data

US 2023/0196031 A1 Jun. 22, 2023

(51) Int. Cl.
*G06F 40/40* (2020.01)
*G06F 16/93* (2019.01)
*G06F 40/186* (2020.01)
*G06F 40/194* (2020.01)
*G06Q 50/18* (2012.01)

(52) U.S. Cl.
CPC .............. *G06F 40/40* (2020.01); *G06F 16/93* (2019.01); *G06F 40/186* (2020.01); *G06F 40/194* (2020.01); *G06Q 50/18* (2013.01)

(58) Field of Classification Search
CPC ...... G06F 40/40; G06F 40/186; G06F 40/194; G06F 16/93; G06Q 50/18
See application file for complete search history.

(56) References Cited

U.S. PATENT DOCUMENTS

| 10,558,880 B2* | 2/2020 | Guzman | G06Q 40/123 |
| 10,740,861 B1* | 8/2020 | Sidler | H04L 41/22 |
| 2005/0071284 A1* | 3/2005 | Courson | G06Q 50/18 |
| | | | 705/80 |

(Continued)

FOREIGN PATENT DOCUMENTS

| CA | 2927580 A1 * | 5/2015 | ........... G06F 40/174 |
| CN | 110246063 B | 9/2019 | |

(Continued)

OTHER PUBLICATIONS

Krzystanek, Przemyslaw, et al.: "System and Method for Improving Admissibility of Electronic Evidence", Application Serial No. PCT/PL2020/050081, filed Nov. 10, 2020, all pages.

*Primary Examiner* — Anne L Thomas-Homescu

(57) ABSTRACT

Systems, methods, and devices of the present disclosure generate adaptive templates for different case types and leverage those templates to ascertain whether case files are sufficiently complete to support desired outcomes. The systems described herein can detect patterns in cases that have been marked as complete, add indicia of those patterns to the adaptive templates, and compare as-yet incomplete case files to the templates to identify and suggest specific types of data that can be added to the incomplete case files to increase the likelihood that those incomplete case files will contain sufficient data to support a desired outcome. Furthermore, the systems described herein are able to adapt the templates and the parameters used therein over time as laws and legal precedents evolve without being reprogrammed.

20 Claims, 4 Drawing Sheets

(56) References Cited

U.S. PATENT DOCUMENTS

| | | | |
|---|---|---|---|
| 2013/0246290 A1* | 9/2013 | Courson | G06F 40/205 |
| | | | 705/311 |
| 2016/0232159 A1* | 8/2016 | Parikh | G06F 21/6245 |
| 2017/0169518 A1* | 6/2017 | Guzman | G06Q 40/123 |
| 2017/0235735 A1* | 8/2017 | Ignatyev | G06Q 10/00 |
| | | | 706/12 |
| 2017/0308517 A1* | 10/2017 | Josifovski | G06Q 10/10 |
| 2019/0236347 A1* | 8/2019 | Guzman | G06F 16/908 |
| 2019/0251145 A1* | 8/2019 | Finn | G06F 9/451 |
| 2020/0201894 A1* | 6/2020 | Battiato | G06F 16/3331 |
| 2022/0343191 A1* | 10/2022 | Natesan | G06N 20/00 |
| 2022/0366130 A1* | 11/2022 | Zagorac | G06F 3/0481 |

FOREIGN PATENT DOCUMENTS

| | | |
|---|---|---|
| CN | 112507110 A | 3/2021 |
| WO | 2019177470 A1 | 9/2019 |
| WO | 2020252695 A1 | 12/2020 |

* cited by examiner

ADAPTIVE TEMPLATE SYSTEM FOR FACILITATING CASE FILE SUFFICIENCY IN EVOLVING DOMAINS

BACKGROUND

Modern computers can perform some legal tasks with great efficiency, speed, and accuracy. Voice-recognition software, for example, can greatly reduce the how long it takes to transcribe oral proceedings. Keyboards allow users to write more quickly than they could if documents had to be written by hand. Digital technology also allows documents and images to be reproduced and distributed quickly and easily. Computers can also perform computationally intensive tasks, such as using computer vision techniques to compare a digitized fingerprint to a large collection of digitized fingerprints or compare a sample of deoxyribonucleic acid (DNA) to a large collection of DNA samples to find a match, with much greater speed and accuracy than humans. Furthermore, the Internet and other computing networks enable users to execute searches of remote data repositories in a matter of seconds or minutes without traveling to the actual sites of those data repositories. Docketing software facilitates efficient storage and retrieval of case data, rapid searching of case data, and automated calendaring of deadlines and other dates of procedural relevance. These are only a few examples of ways that modern computer technology empowers legal professionals to do more than could be achieved through manual human effort alone.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description below, are incorporated in, and form part of, the specification. These figures serve to illustrate various examples of elements recited in the claims and to explain various principles and advantages of those examples.

Figure 1:
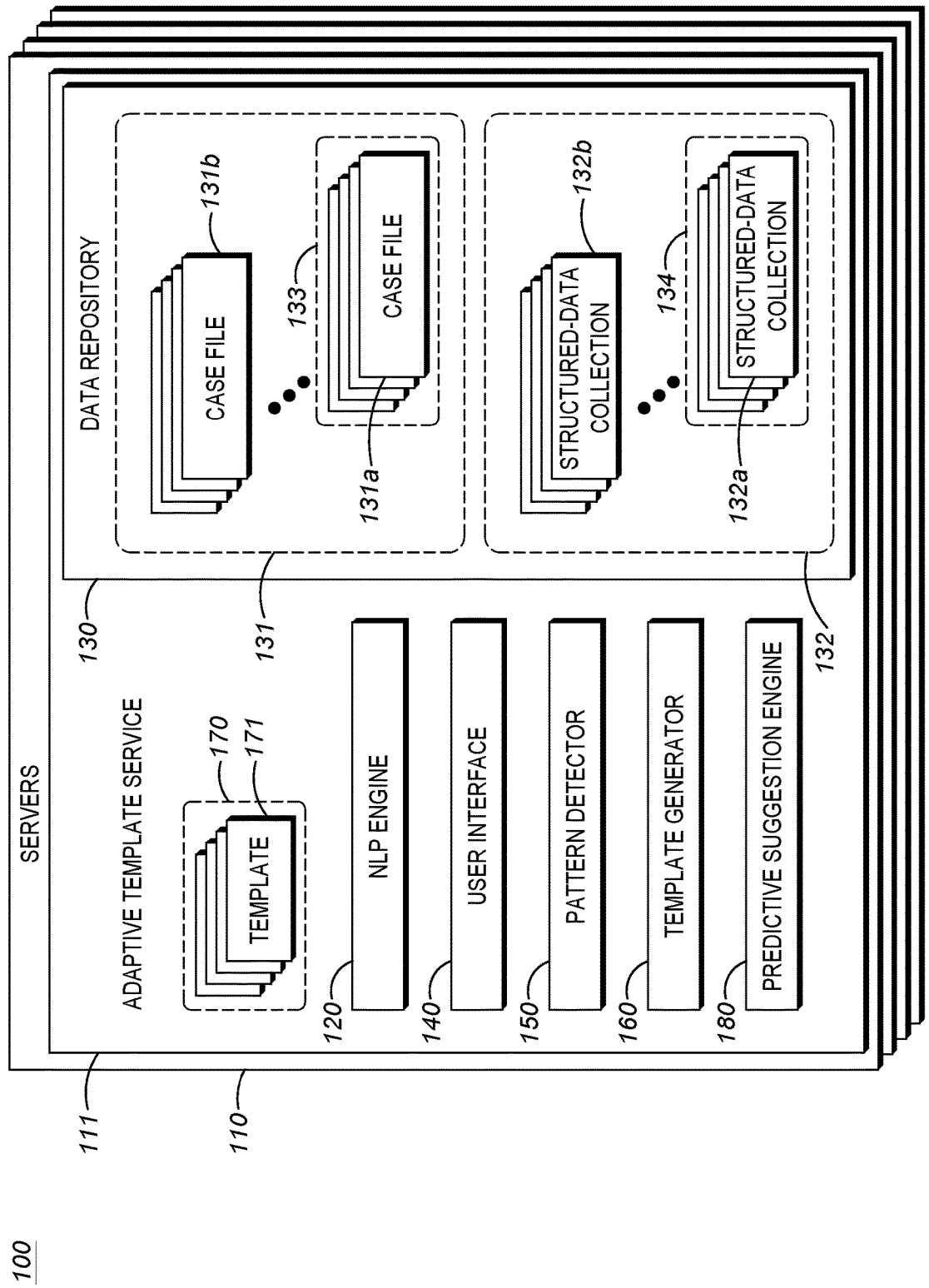
FIG. 1 illustrates a computing environment in which systems described in the present disclosure can operate, according to one illustrative and non-limiting example.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION

Despite the remarkable functionality that modern computing hardware and software provide to prosecutors and other legal professionals, there are some aspects of legal work that cannot readily be performed by existing software. Software is usually well-suited for performing deterministic tasks in which a known formula is applied to a finite number of known input parameters to produce a desired output. In a legal context, however, there are some problems for which it is impractical to know a priori which parameters will determine an outcome, what the values of those parameters are, and whether there exists a reasonably accurate formula for predicting that outcome based on those parameters. Even if some parameters are known to influence an outcome of interest, the values of those parameters might not be known beforehand or may change after the target time for predicting the outcome has passed.

For example, the verdict (e.g., an outcome) of a jury trial may hinge on characteristics of the members of the jury (e.g., a parameter). The target time for predicting the outcome of the trial may be before the jury is selected and before the trial begins. Similarly, the time for predicting whether sufficient evidence has been collected to secure a conviction for a crime may be before a suspect has been charged with the crime or brought to trial for the crime.

In both of these examples, a failure to predict the outcome accurately may result in a great deal of waste of attorney time, attorney's fees paid for that time, and money (e.g., to pay monetary damages resulting from the trial). In addition, a failure to predict whether evidence is sufficient to secure a conviction before a criminal trial may result in a guilty suspect being acquitted—and restrictions on double jeopardy in some jurisdictions (e.g., the United States) may prevent prosecutors from bringing the suspect to justice later even if sufficient evidence for a conviction is discovered after the trial.

In some jurisdictions (e.g., the United States), the right to a speedy trial may tightly constrain the amount of time available to make a prediction about case file sufficiency. Furthermore, budget constraints imposed on law-enforcement agencies may leave few person-hours available for evaluating whether evidence is sufficient, particularly for complicated cases in which discovery procedures unearth tens of thousands of electronic documents and other files that may contain information that is pertinent to the question of whether a case file is sufficiently complete. These challenges may render it impractical to rely on human effort and intuition alone to predict case file sufficiency.

Another complicating factor rests in the fact that the law is an ever-evolving domain that changes over time—oftentimes without warning. A new statute may be passed by a legislature or a new ruling in a case may set a precedent that courts are obliged to follow. Changes in laws that deal with criminal procedure, for example, may drastically affect the question of whether evidence is sufficient to secure a conviction in a case. As a result, a static solution implemented in computer software for predicting a case outcome may become obsolete overnight. It may be impractical or prohibitively expensive to rewrite software code to update or replace algorithms and parameter sets each time the law changes—particularly if an entirely new prediction algorithm has to be derived and tested for accuracy before implementation.

The challenges listed above and other challenges present non-trivial obstacles to creating a computing system that can predict legal outcomes in certain contexts. Specifically, predicting whether a case file is "complete" (e.g., includes sufficient amounts of certain types of evidence to secure a criminal conviction or some other type of outcome) is a non-trivial task that existing software solutions are not equipped to perform well. Thus, there exists a need for enhanced technical methods, devices, and systems for predicting whether case files are sufficiently complete before prosecutors are obliged to rely on those case files during consequential criminal proceedings (e.g., trials).

Systems, methods, and devices of the present disclosure address these technical challenges by generating adaptive templates for different case types and leveraging those templates to ascertain whether case files are sufficiently complete to support desired outcomes. The systems described herein can detect patterns in cases that have been marked as complete, add indicia of those patterns to the adaptive templates, and use those patterns to identify and suggest specific types of data that can be added to incomplete case files to increase the likelihood that those incomplete case files will contain sufficient data to support a desired outcome. Furthermore, the systems described herein are able to adapt the templates and the parameters used therein over time as laws and legal precedents evolve without being reprogrammed.

Referring now to the drawings, FIG. 1 illustrates a computing environment 100 in which systems described in the present disclosure can operate, according to one illustrative and non-limiting example. As shown, the computing environment 100 includes servers 110 that execute an adaptive template service 111. Persons of skill in the art will understand that any functionality attributed to the servers 110 or the blocks shown therein may be executed using computing resources such as processors, memory, network interconnects, and storage that are distributed across a single site or multiple sites (e.g., in a cloud computing platform) and are interconnected via a data center network, an enterprise network, a local area network (LAN), a virtual private network (VPN), or some other type of digital communication network (or a combination thereof). Persons of skill in the art will also understand that functionality attributed to the adaptive template service 111 or any block shown therein may also be performed by software modules that are separate from the adaptive template service 111 and are merely in communication therewith without departing from the spirit and scope of this disclosure. In addition, persons of skill in the art will also understand that functionality attributed to the servers 110 or the adaptive template service 111 may also be performed by software modules that are executed on an endpoint device (e.g., a desktop computer or workstation) without departing from the spirit and scope of this disclosure.

As shown, the servers 110 include a data repository 130 that includes case files 131. As used herein, the term "case" refers to a matter (e.g., a petition, a criminal prosecution, a civil lawsuit, a patent application, etc.) being investigated, prosecuted, or otherwise handled by an entity (e.g., a law firm, a law enforcement agency, a private investigator, etc.) for the purpose of achieving a desired outcome (e.g., a criminal conviction, an award of monetary damages, issuance of a patent application, etc.). The term "case file" refers to a compilation of data pertinent to a specific case. Each of the case files 131 may be associated with (e.g., labeled or tagged as) a case type (e.g., robbery, public disturbance, grand theft auto, trespassing, battery, assault, traffic violation, fraud, shoplifting, theft, burglary, larceny, arson, mass shooting, welfare check, embezzlement, insider trading, vandalism, bribery, perjury, extortion, tax evasion, etc.).

A case file may comprise many different types of digital data that are stored in many different digital formats. For example, a case file may include video data (e.g., digital footage from dashboard cameras, body cameras, security cameras, or smartphone cameras), audio data (e.g., digital audio recordings from 9-1-1 calls and undercover telephone conversations recorded via wiretapping), image data (e.g., digital photos of crime scenes, autopsy photos, mug shots, and fingerprint images), textual data (e.g., transcriptions of audio conversations, transcriptions of video data, incident reports, witness statements, email correspondence, graphs, diagrams, and reports from the Combined Deoxyribonucleic Acid (DNA) Index System (CODIS)), and data found on hard drives or flash drives confiscated from suspects.

Some of the textual data in found in the case files 131 may be unstructured data (e.g., data that is not formatted or organized in a predefined manner and does not conform to a predefined data model). For example, natural-language data that is written in human languages (e.g., English, Spanish, French, Russian, Chinese, Tagalog, Farsi, etc.) is typically unstructured data. Transcriptions of audio conversations, transcriptions of video data, witness statements, incident reports, and many other types of textual data are likely to be written in natural languages.

While such unstructured natural-language data may be relatively easy for humans to parse, natural-language data may be unpredictably organized (e.g., when casual register is used rather than formal register during conversations) and replete with ambiguities that arise due to different meanings that words and phrases may have in different contexts. For example, in one context, the phrase "the bat flew away from the batter and struck the fan in front of the ruler sitting on the log" could signify that a baseball bat flew out of a baseball player's hand and struck an attendee seated in front of a monarch who sat on a logbook to get a better view of a baseball game. In another context, the same phrase could signify that a flying mammal flew away from a bowl of cake batter and collided with a box fan positioned in front of a measuring stick that was sitting on a felled tree trunk. In another example, in one context, the phrase "after the seal was removed, the band that included the mole could be seen" could signify that a mole of a particular molecule became visible after an airtight seal was removed from a test tube that was subjected to analytical band centrifugation. In another context, the same phrase could signify that a small terrestrial mammal playing a musical instrument in a rock band became visible after security personnel removed a disruptive marine mammal from the stage.

The lack of organization and the ambiguities that frequently occur in natural-language data make it much more difficult for computer software to parse, extract meaning from, and search through natural-language data as opposed to structured data. Structured data can be stored very efficiently and unambiguously, so computer software can parse and search through structured data without having to execute complicated, time-consuming algorithms to organize, disambiguate, or condense the information stored in structured data.

Therefore, it is advantageous to derive structured data from the unstructured data found in the case files 131 for the reasons discussed above and for other reasons to be discussed in detail below. The natural-language processing (NLP) engine 120 is a software module that derives the structured-data collections 132 from natural-language data found in the case files 131. In one example, each of the structured-data collections 132 may be derived from one of the case files 131, respectively, such that each of the structured-data collections 132 maps to a respective one of the case files 131 (and, by extension, to the case to which the respective case file maps). Thus, structured-data collection 132a may be derived from case file 131a, structured-data collection 132b may be derived from case file 131b, and so forth.

Persons of skill in the art will recognize that there are many natural-language software tools that could readily be used to achieve the functions ascribed to the NLP engine 120 without undue experimentation. The Natural Language Toolkit (NLTK), SpaCy, TExtBlob, Textacy, and PyTorch-NLP are several examples of open-source tools that are available in the Python programming language, although there are many other NLP software tools available in many other programming languages. Such NLP tools may use many different techniques to extract features from natural-language data. For example, vectorization techniques such as Bag-of-Words, Term Frequency-Inverse Document Frequency (TF-IDF), Word2Vec, Global Vectors for word representation (GloVe), and FastText may be used to extract features. Techniques such as tokenization (e.g., N-gram tokenization), lemmatization, stemming, and part-of-speech tagging may be used to extract features in addition to, or as part of, vectorization techniques. Persons of skill in the art will understand that features may be digitally represented in a variety of ways. For example, a feature may be represented by an integer, a real number (e.g., decimal), an alphanumeric character, or a sequence of alphanumeric characters. Features may also be discretized, normalized (e.g., converted to a scale from zero to one), or preprocessed in other ways.

Features that are extracted from natural-language data can be used as input for machine-learning components of NLP tools that perform Named Entity Recognition (NER) to identify entities such as people, locations, companies, and dates that are mentioned in natural-language data. In addition, NLP tools can apply text summarization techniques (e.g., LexRank and TextRank) to those features to summarize lengthy documents. Furthermore, NLP tools can apply techniques such as Latent Semantic Analysis (LSA), Probabilistic Latent Semantic Analysis (PLSA), Latent Dirichlet Allocation (LDA), and Correlated Topic Model (CTM) to the features to perform topic modeling. Persons of skill in the art will recognize that an in-depth discussion of the many NLP tools that are available and how those tools process input to generate output is beyond the scope of this disclosure.

The structured-data collections 132 derived from the case files 131 via the NLP engine 120 may comprise data of various data types. In one example, suppose the case file 131a is associated with a case type of "automobile accident." Also suppose that the structured data collection 132a is derived from the case file 131a. Some examples of data types that can be stored as structured data in the structured-data collection 132a may include the time and location of the automobile accident, weather conditions, whether headlights were operating in each vehicle involved in the accident at the time of the accident, whether the occupants of the vehicles involved in the accident were wearing seat belts, whether data from cellular phones (e.g., accelerometer data that indicates a moment of impact, usage data that indicates whether a driver was texting while driving, etc.) possessed by the occupants has been added to the case file 131a, data that identifies the vehicles involved in the accident (e.g., makes, models, and license plate numbers), insurance information (e.g., policy numbers, liability limits, and whether each driver was insured), and any additional type of data that may be pertinent to the case type associated with the case file 131a. Some other examples of data types that may be pertinent to case types associated with the case files 131 include outcomes resulting from an incident (e.g., an incident described by one of the case files 131), such as the number of deaths, the number of injuries resulting in hospitalization, the number of responders dispatched to the incident and whether statements were collected from each, the duration of the incident, the population density of the area where the event occurred (which may serve as a proxy estimate of the number of witnesses to the incident), and which witnesses were interviewed. Other data types may represent the time of day that the incident occurred (e.g., morning, afternoon, night, or the hour of the day), the day of the week on which the incident occurred, the month in which the incident occurred, and whether the incident occurred on a holiday. Other data types could represent a location where the incident took place (e.g., an address, a zip code, Global Positioning System (GPS) coordinates, a city, a county, etc.). Other data types could represent a currency value associated with property involved in the incident (e.g., the value of a chattel that was stolen, the amount of damage that was done to real property or automobiles involved in the incident, etc.). Additional data types could represent whether a suspect was or is being prosecuted as a result of the incident, whether the suspect is a repeat offender, whether the suspect was on parole at the time of the incident, whether the suspect has any known affiliations with criminal entities (e.g., the mafia, a street gang, a drug-trafficking cartel, or a terrorist group), whether force was used during the incident in an attempt to apprehend the suspect, and whether body cam footage from each officer who responded to the incident has been added to the case files 131. Some data types may also represent any mental illnesses (e.g., bipolar disorder, schizophrenia) or cognitive impairments (e.g., Alzheimer's disease, dementia) known to affect a suspect, witnesses, or first responders to the incident. In addition, some data types may indicate how the identities of witnesses, victims, or suspects were verified (e.g., driver licenses, passports, employer badges, etc.).

Some data types may be very likely to be found in case files associated with specific case types. For example, a case file associated with the case type "homicide" may include data types that indicate forensic evidence that has been collected (e.g., DNA samples, fingerprints, hair, dental records, and fiber samples) and types of documentation that have been collected (e.g., mortician documents listing causes of death, photos of injuries, and life insurance documents). In another example, case files associated with the case type "arson" may include data types that indicate results of chemical tests to detect accelerants (e.g., gasoline or lighter fluid). Case files associated with the case type "bribery" may include a data type indicating an amount of currency offered as a bribe. Case files associated with the case type "burglary" may include a data type indicating a point of entry (e.g. a window or a door) through which a burglar accessed a building. Case files associated with the case type "fraud" may include data types indicating types of documentation collected, such as tax returns, bank statements, receipts, and fake identification (ID) cards. Case files associated with the case type "drug possession" may include data types that indicate quantities and types of illicit substances found in a suspect's possession.

The examples of data types and case types provided above are merely illustrative and do not constitute an exhaustive list of case types and data types that may be used. Persons of skill in the art will recognize that many other case types and data types be used without departing from the spirit and scope of this disclosure.

Case files in a subset 133 of the case files 131 may be tagged as complete, thereby indicating that case files in the subset 133 include sufficient amounts of certain types of evidence, documentation, and other data to support a desired outcome (e.g., a criminal conviction or a favorable judgment). Through the user interface 140, a user may access and tag the case files in the subset 133 manually (e.g., by clicking on a graphical button shown on an electronic display via a mouse or entering a predefined command via a keyboard). A case file in the subset 133 may also be tagged as complete automatically when an action of a predefined type is effected upon the case file (e.g., when a user uploads a digital copy of a favorable judgment from a court of final appellate jurisdiction or exclusive jurisdiction). The subset 134 of the structured-data collections 132 includes the structured-data collections derived from the case files in the subset 133 of the case files 131.

The structured-data collections 132, including the subset 134, are provided for analysis to the pattern detector 150. In one example, the pattern detector 150 is a software module configured to determine which data types tend to appear in structured-data collections derived from case files that have been tagged as complete and, in some examples, which data types tend to be absent from structured-data collections derived from case files that have not been tagged as complete. For example, the pattern detector 150 may determine a quantity (e.g., a number or a percentage) of the structured-data collections in the subset 134 that were derived from case files associated with a particular case type and that include data of a particular data type. The pattern detector may compare the quantity (e.g., number or percentage) to a threshold. If the quantity meets or exceeds the threshold, the pattern detector 150 may signal the template generator 160 to add the particular data type to a list of data types for a template associated with the particular case type. The pattern detector 150 may further apply a time constraint such that structured-data collections derived from case files that were tagged as complete before a specific time (e.g., a calendar date) are excluded from the determined quantity. If the threshold is a percentage, applying a time constraint in this manner will ensure that patterns that have begun to emerge relatively recently (e.g., after a calendar date) will be detected relatively quickly. In scenarios in which the law in a jurisdiction is changed by a recent judgment, for example, applying a time constraint that excludes structured-data collections derived from case files that were tagged as complete before the judgment was issued can help the pattern detector 150 identify a pattern more quickly.

The pattern detector 150 may also use other techniques to detect other patterns in structured-data collections for case files of the particular case type. For example, the pattern detector 150 may detect correlations between data types that are included in the structured data collections and use those correlations to infer when case files are likely to be insufficient to support a desired outcome. For example, suppose the particular case type is "high-speed chase" and that a first data type represents the number of police vehicles that were involved in the high-speed chase. Also suppose that a second data type represents the number of videos from dashboard cameras mounted on police vehicles that were involved in the high-speed chase. The pattern detector 150 may determine a correlation coefficient between the first data type and the second data type and discover a strong correlation (e.g., a correlation coefficient that is closer to one or to negative one than to zero). The pattern detector 150 may signal the template generator 160 to add the correlation coefficient between the first data type and the second data type to metadata in the template associated with the "high-speed chase" case type.

In this example, the number of police vehicles involved in a high-speed chase may typically match the number of videos from dashboard cameras in case files associated with the "high-speed chase" case type that have been tagged as complete. Thus, in this example, the correlation coefficient between the first data type and the second data type may be close to one. If a particular "high-speed chase" case file that has not been tagged as complete has a mismatch between the value of the first data type and the value of the second type (e.g., there are fewer dashboard camera videos in the case file than police vehicles involved in the chase), the structured-data collection derived from the particular case file would be inconsistent with the pattern indicated by the correlation coefficient and the predictive suggestion engine 180 (described below) could recommend that more dashboard camera videos be added to the particular case file.

A correlation coefficient (e.g., a Pearson Correlation Coefficient) between two data types is one type of pattern indicator that may be included in metadata for a template, but other types of pattern indicators can also be used in other examples if sufficient computing resources (e.g., memory and storage) are available. For example, the pattern detector 150 may train a machine-learning model to predict the value of a first data type based on the values of other data types that are found in structured-data collections for case files of the particular case type. Specifically, the values of the other data types can be used as input features that are used by the machine-learning model to predict the value of the first data type. If the machine-learning model satisfies a predefined performance metric, the pattern detector 150 may signal the template generator 160 to add the machine-learning model to metadata in the template associated with the particular case type. The predefined performance metric may be, for example, a threshold level of accuracy, precision, recall, or F1-score (which is determined by dividing the product of precision multiplied by recall by the sum of precision and recall, then multiplying the result by two). There are many different types of inductive machine-learning models that could be used, such as neural networks, support vector machines, Bayesian belief networks, association-rule models, decision trees, nearest-neighbor models (e.g., k-NN), regression models, and Q-learning models.

The template generator 160 receives input from the pattern detector 150 and uses that input to generate or update the templates 170 so that the templates 170 will reflect patterns detected by the pattern detector 150. (In one example, the template generator 160 is a software module.) Like the case files 131, each of the templates 170 is associated with a case type. Each of the templates 170 may comprise a respective list of data types for the template and an indication of the case type with which the template is associated. When the pattern detector 150 signals the template generator 160 to add a particular data type to the list of data types for a particular template, the template generator 160 may add the particular data type to the list accordingly. The template generator 160 may also add other data to the templates 170, such as metadata that indicates when each template was last updated and with which case types with which the templates 170 are associated. In addition, the template generator 160 may add pattern indicators that indicate relationships between data types to the templates 170 if the pattern detector 150 detected relationships between any data types (e.g., as described above).

Furthermore, in some examples, the template generator 160 may assign the data types that are included in a list to groups and subgroups that are characterized by descriptors. For example, data types such as "patrol vehicle footage," "body camera footage," "smart phone footage," and "traffic camera footage" may be assigned to a subgroup characterized by the descriptor "video footage" and to a group characterized by the descriptor "Media." Data types such as "license plate number," "VIN number," "make," and "model" may be assigned to a group characterized by the descriptor "vehicles."

Once the templates 170 have been generated, the adaptive template service 111 can be used to predict whether or not a case file that has not yet been marked as complete contains sufficient data to support a desired outcome (e.g., an outcome which, if achieved, would result in the case file being tagged as complete). Suppose, for example, the case file 131*b* has not been tagged as complete. Also suppose that information about the case file 131*b* is loaded into the user interface 140 and displayed on an electronic display (e.g., a Liquid Crystal Display (LCD), a Liquid Emitting Diode (LED) display, an Organic Light Emitting Diode (OLED) display, a plasma monitor, a Cathode Ray Tube (CRT) display, etc.) in response to a user request received via an I/O device (e.g., a keyboard, a computer mouse, a touch screen, or a microphone). The NLP engine 120 can derive the structured-data collections 132*b* derived from the case file 131*b*.

The predictive suggestion engine 180 (which, in one example, is a software module) identifies the case type associated with the case file 131*b* and the structured-data collection 132*b*, then retrieves the template 171 that is associated with that case type. Next, the predictive suggestion engine 180 compares the template 171 to the structured-data collection 132*b* to determine whether the structured-data collection 132*b* is inconsistent with any patterns described in the template 171 and provides a suggestion that, if heeded, is likely to help remedy the inconsistency. For example, if the predictive suggestion engine 180 identifies a data type that is included in the list of data types for the template 171, but is not found in the structured-data collection 132*b*, the predictive suggestion engine 180 then signals the user interface 140 to transmit an electronic notification to the user to suggest that data of the identified data type be added to the case file 131*b*.

In response to the electronic notification, the user may elect to provide feedback (e.g., via an I/O device) to indicate that the user does not wish for the predictive suggestion engine 180 to suggest that data of the identified data type be added to the case file 131*b* or to any other case file that is associated with the same case type as the case file 131*b*. In response, the template generator 160 may remove the identified data type from the list of data types for the template 171. The user may also elect to provide feedback suggesting that an additional data type be added to the list of data types for the template 171. In response, the template generator 160 may add the additional data type to the list of data types for the template 171.

Figure 2:
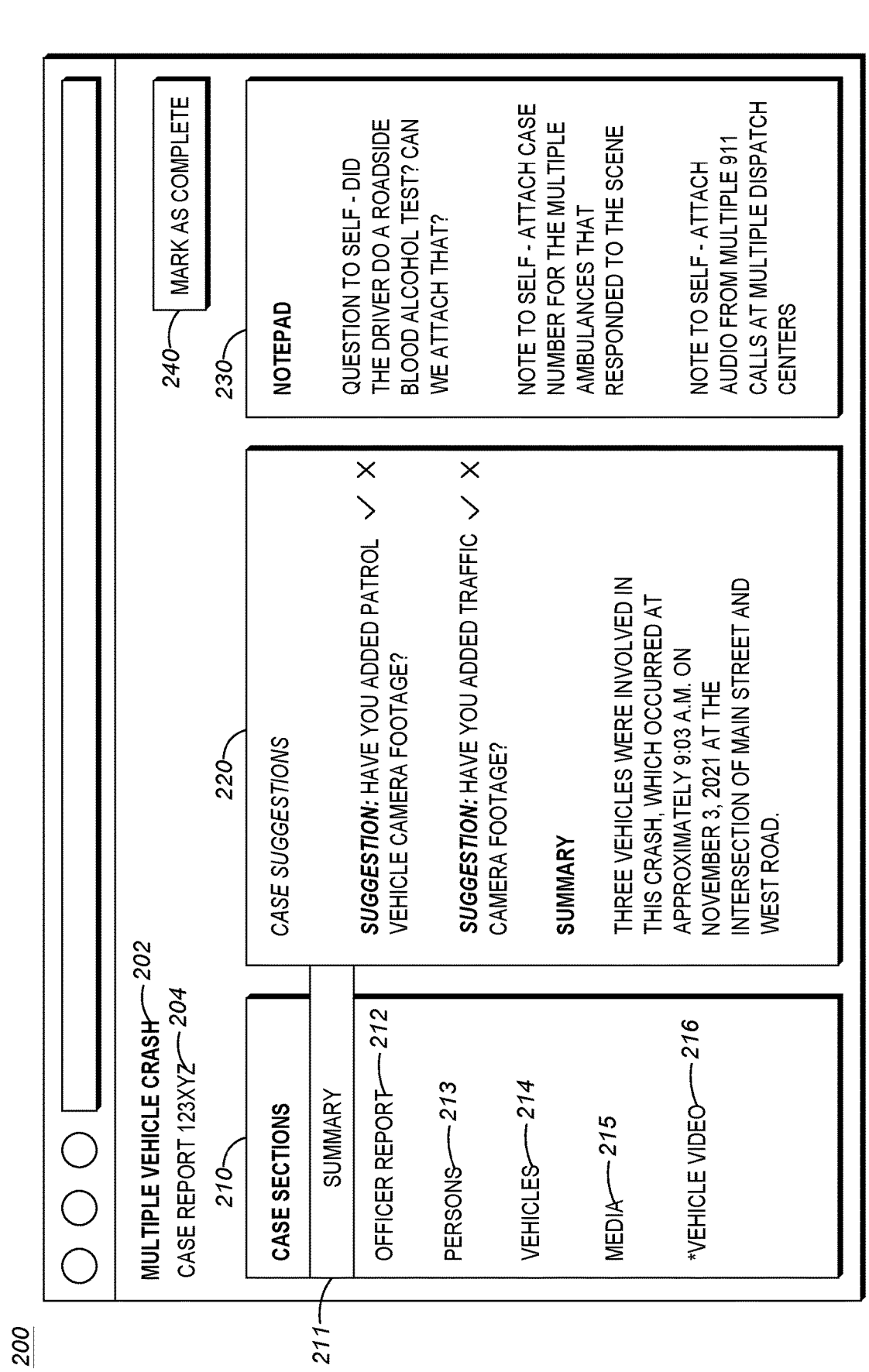
FIG. 2 illustrates one example of how a user interface for systems described herein may appear on an electronic display, according to one illustrative and non-limiting example.

FIG. 2 illustrates one example of how a user interface (e.g., such as the user interface 140 described in FIG. 1) for systems described herein may appear on an electronic display, according to one illustrative and non-limiting example. Persons of skill in the art will recognize that other user interface designs and schemes may be used without departing from the spirit and scope of this disclosure.

As shown, when information about a case file is loaded, the graphical user interface (GUI) 200 may display a case type 202 associated with the case file and an identifier 204 for the case file. The sidebar 210 includes selectable tabs 211, 212, 214, 215, 216. As shown, some of the selectable tabs may be labeled by descriptors (e.g., "Summary," "Officer Report," "Vehicles," and "Media") that characterize groups or subgroups to which data types in a list of data types for a template associated with the case type 202 are assigned. The GUI 200 is shown with the tab labeled "Summary" selected. An example summary (e.g., provided by a user or generated automatically) is shown in the bottom of the content area 220.

As shown, the upper portion of the content area 220 includes two suggestions that have been identified for the currently loaded case file based on a comparison of a structured-data collection derived from the loaded case file to the template associated with the case type 202. The user can click on the checkbox next to each suggestion to accept the suggestion. In accordance with the suggestions shown, the GUI 200 includes the suggested tab labeled "*Vehicle Video." The user can select the "*Vehicle Video" tab to add video footage from a traffic camera or a patrol vehicle camera as suggested. Conversely, the user can click on the "x" next to each suggestion to accept the suggestion. The "*Vehicle Video" tab can be deleted from the GUI 200 automatically if both of the suggestions shown are rejected.

The GUI 200 also includes a notepad section 230 in which the user can enter notes in natural-language. Any notes entered by the user can be added to the loaded case file and used to derive structured data as described above with respect to natural-language data. In addition, the GUI 200 includes a button 240 whereby the user can signal that the loaded case file should be marked as complete (e.g., by clicking on the button 240).

Figure 3:
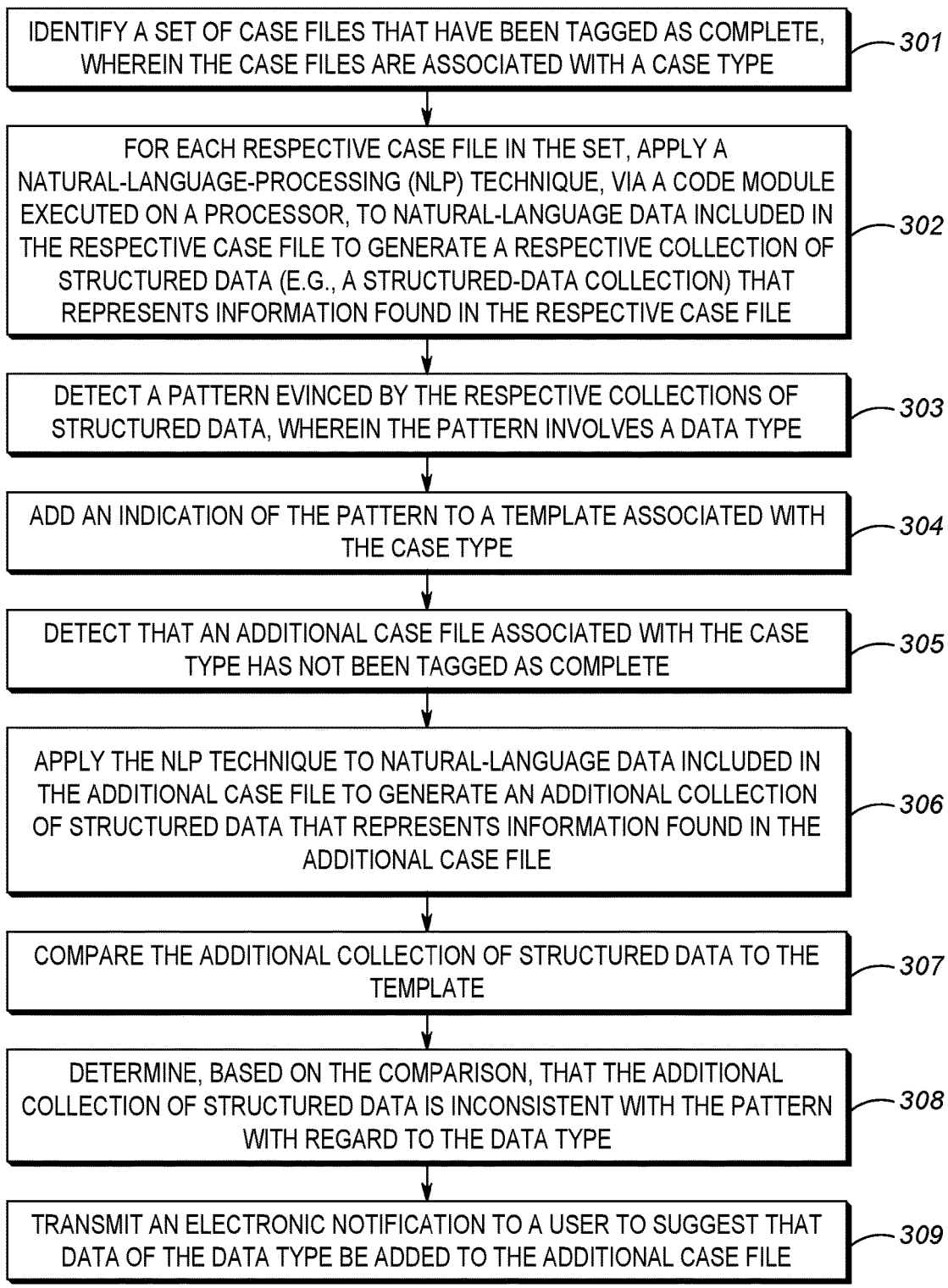
FIG. 3 illustrates functionality for an adaptive template service to perform for predicting whether case files include sufficient data to support a desired outcome, according to one illustrative and non-limiting example.

FIG. 3 illustrates functionality 300 for an adaptive template service to perform for predicting whether case files include sufficient data to support a desired outcome, according to one illustrative and non-limiting example. The functionality 300 does not have to be performed in the exact sequence shown. Also, various blocks may be performed in parallel rather than in sequence. Accordingly, the elements of the functionality 300 are referred to herein as "blocks" rather than "steps." The functionality 300 can be executed as instructions on a machine (e.g., by one or more processors), where the instructions are stored on a transitory or non-transitory computer-readable storage medium. While only nine blocks are shown in the functionality 300, the functionality 300 may comprise other actions described herein. Also, in some examples, some of the blocks shown in the functionality 300 may be omitted without departing from the spirit and scope of this disclosure.

As shown in block 301, the functionality 300 includes: identifying a set of case files that have been tagged as complete, wherein the case files are associated with a case type. In other words, each case file in the set is associated with the same case type. Identifying this set of case files will allow a template for that case type to be generated (or updated).

As shown in block 302, the functionality 300 includes: for each respective case file in the set, applying a natural-language-processing (NLP) technique, via a code module executed on a processor, to natural-language data included in the respective case file to generate a respective collection of structured data (e.g., a structured-data collection) that represents information found in the respective case file.

As shown in block 303, the functionality 300 includes detecting a pattern evinced by the respective collections of structured data, wherein the pattern involves a data type. Detecting the pattern evinced by the respective collections of structured data may comprise, for example, determining that a quantity of the respective collections of structured data includes data of the data type; and detecting that the quantity meets a predefined threshold. Detecting the pattern evinced by the respective collections of structured data may also comprise, for example, detecting a relationship between the data type and an additional data type. Furthermore, determining that the additional collection of structured data is inconsistent with the pattern may comprise detecting that a relationship between a value of the data type in the collection of structured data and a value of the additional data type in the collection of structured data is inconsistent with the relationship between the data type and an additional data type.

As shown in block 304, the functionality 300 includes adding an indication of the pattern to a template associated with the case type. Adding the indication of the pattern to the template associated with the case type may comprise, for example, adding the data type to a list of data types for the template.

As shown in block 305, the functionality 300 includes detecting that an additional case file associated with the case type has not been tagged as complete. This detection may occur, for example, when the additional case file is loaded into a user interface.

As shown in block 306, the functionality 300 includes applying the NLP technique to natural-language data included in the additional case file to generate an additional collection of structured data that represents information found in the additional case file.

As shown in block 307, the functionality 300 includes comparing the additional collection of structured data to the template.

As shown in block 308, the functionality 300 includes determining, based on the comparison, that the additional collection of structured data is inconsistent with the pattern with regard to the data type. For example, the functionality 300 may comprise detecting that the additional collection of structured data does not include data of the data type.

As shown in block 309, the functionality 300 includes transmitting an electronic notification to a user to suggest that data of the data type be added to the additional case file.

The functionality 300 may further comprise receiving, from the user via an input/output (I/O) device in response to the electronic notification, feedback indicating that data of the data type should not be suggested for the additional case file; and, in response to the feedback, removing the data type from a list of data types for the template.

The functionality 300 may further comprise receiving, from the user via an input/output (I/O) device, feedback suggesting that an additional data type be added to a list of data types for the template; and, in response to receiving the feedback, adding the additional data type to the list of data types for the template.

Figure 4:
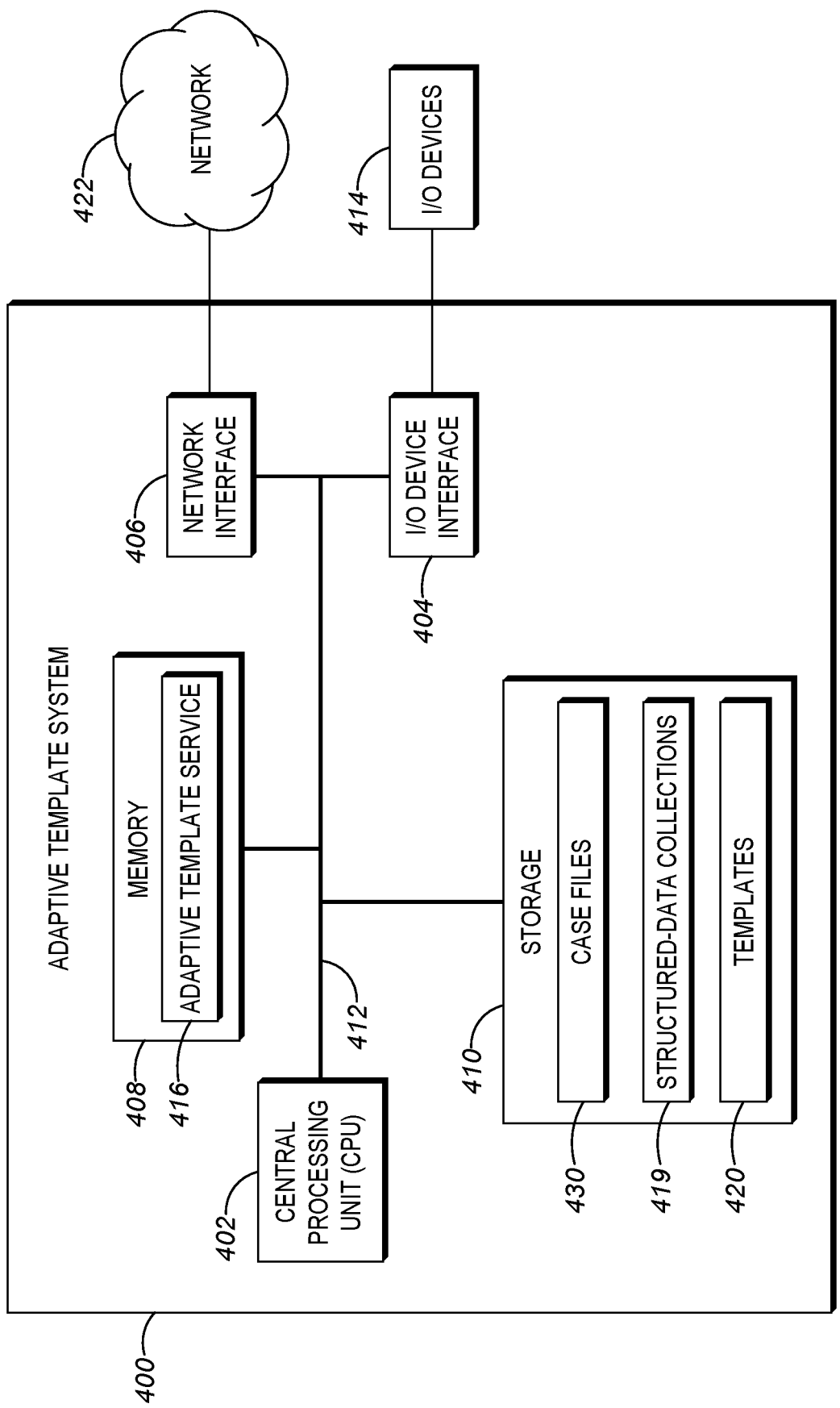
FIG. 4 illustrates an adaptive template system that generates templates based on structured-data collections and uses those templates to suggest types of data to add to a case file that has not yet been tagged as complete, according to one illustrative and non-limiting example.

FIG. 4 illustrates an adaptive template system 400 that generates templates 420 based on structured-data collections 419 (which are derived from case files 430) and uses those templates to suggest types of data to add to a case file that has not yet been tagged as complete, according to one illustrative and non-limiting example. As shown, the adaptive template system 400 comprises a central processing unit (CPU) 402 and an input/output (I/O) device interface 404 that allows I/O devices 414 (e.g., a keyboard, a mouse, or a touch screen) to be connected to the adaptive template system 400. The adaptive template system 400 also comprises a network interface 406, a memory 408, storage 410, and an interconnect 412 (e.g., a common data and address bus).

The CPU 402 may retrieve application data and programming instructions from the memory 408 and execute those programming instructions. The interconnect 412 provides a digital transmission path through which the CPU 402, the I/O device interface 404, the network interface 406, the memory 408, and the storage 410 can transmit data and programming instructions amongst each other. While the CPU 402 is shown as a single block, persons of skill on the art will understand that the CPU may represent a single CPU, a plurality of CPUs, a CPU with a plurality of processing cores, or some other combination of processor hardware.

The memory 408 may be random access memory (RAM) and the storage 410 may be non-volatile storage. Persons of skill in the art will understand that the storage 410 may comprise any combination of internal or external storage devices (e.g., disc drives, removable memory cards or optical storage, solid state drives (SSDs), network attached storage (NAS), or a storage area-network (SAN)). The case files 430, the structured-data collections 419, and the templates 420 may be located partially or fully in the storage 410 as shown or in the memory 408 in any combination.

As shown, the adaptive template service 416 may be stored in the memory 408 and may function as described with respect to FIGS. 1-3. For example, the adaptive template service 416 may apply an NLP technique to the case files 430 to generate the structured-data collections 419. The adaptive template service 416 may then generate or update the templates 420 to reflect patterns that are detected in the structured-data collections 419 for cases that have been marked as complete. The adaptive template service 416 may generate or update a template for each of any number of case types such that each of the templates 420 is associated with a particular case type. When an additional case file that has not been marked as complete is loaded into a user interface of the adaptive template service 416, the adaptive template service 416 can compare a structured-data collection for the additional case file to a template associated with the same case type as the additional case file. If the structured-data collection for the additional case file is inconsistent with a pattern reflected by the template with regard to a particular data type, the adaptive template service 416 can transmit an electronic notification (e.g., via the network 422) to suggest that data of the particular data type be added to the additional case file.

Examples are herein described with reference to flowchart illustrations and/or block diagrams of methods, apparatuses (e.g., systems), and computer program products. Persons of skill in the art will understand that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein do not, in some examples, have to be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic notifications, electronically encoded video, electronically encoded audio, etc., and cannot execute a module of code on a processor, among other features and functions set forth herein).

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, or contains a list of elements does not have to include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1%, and in another example within 0.5%. The term "one of," without a more limiting modifier such as "only one of," and when applied herein to two or more subsequently defined options such as "one of A and B," should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling," or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, an electrical signal, or a mechanical element depending on the particular context.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions or in one or more application specific integrated circuits (ASICs) in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. In the context of this document, a computer-usable or computer-readable medium may be any medium that can contain, store, communicate, propagate, or transport the program for use by, or in connection with, the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs without undue experimentation. For example, computer program code for carrying out operations of various example embodiments may be written in an object-oriented programming language such as Java, Smalltalk, C++, Python, or the like. However, the computer program code for carrying out operations of various example embodiments may also be written in conventional procedural programming languages such as the "C" programming language or similar programming languages. The program code may execute entirely on a computer, partly on the computer, as a stand-alone software package, partly on the computer and partly on a remote computer or server, or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for an adaptive template system that facilitates case file sufficiency comprising:
   identifying a set of case files that have been tagged as complete, wherein the case files are associated with a case type;
   for each respective case file in the set, applying a natural-language-processing (NLP) technique, via a code module executed on a processor, to natural-language data included in the respective case file to generate a respective collection of structured data that represents information found in the respective case file;
   detecting a pattern evinced by the respective collections of structured data, wherein the pattern involves a data type representing a first type of evidence for an incident described by one of the set of case files;
   adding an indication of the pattern to a template associated with the case type;
   detecting that an additional case file associated with the case type has not been tagged as complete;
   applying the NLP technique to natural-language data included in the additional case file to generate an additional collection of structured data that represents information found in the additional case file;
   comparing the additional collection of structured data to the template;
   determining, based on the comparison, that the additional collection of structured data is inconsistent with the pattern with regard to a correlation between the data type and another data type representing a second type of evidence for the additional case file to support a criminal conviction; and
   transmitting an electronic notification to a user to suggest that data of the data type be added to the additional case file.

2. The method of claim 1, wherein detecting the pattern evinced by the respective collections of structured data comprises:
   determining that a quantity of the respective collections of structured data includes data of the data type; and
   detecting that the quantity meets a predefined threshold.

3. The method of claim 1, wherein adding the indication of the pattern to the template associated with the case type comprises adding the data type to a list of data types for the template.

4. The method of claim 1, wherein determining, based on the comparison, that the additional collection of structured data with regard to the data type comprises detecting that the additional collection of structured data does not include data of the data type.

5. The method of claim 1, wherein detecting the pattern evinced by the respective collections of structured data comprises detecting a relationship between the data type and an additional data type, and wherein determining that the additional collection of structured data is inconsistent with the pattern comprises detecting that a relationship between a value of the data type in the collection of structured data and a value of the additional data type in the collection of structured data is inconsistent with the relationship between the data type and an additional data type.

6. The method of claim 1, further comprising:
   receiving, from the user via an input/output (I/O) device in response to the electronic notification, feedback indicating that data of the data type should not be suggested for the additional case file; and
   in response to the feedback, removing the data type from a list of data types for the template.

7. The method of claim 1, further comprising:
   receiving, from the user via an input/output (I/O) device, feedback suggesting that an additional data type be added to a list of data types for the template; and
   in response to receiving the feedback, adding the additional data type to the list of data types for the template.

8. An adaptive template system that facilitates case file sufficiency, the adaptive template system comprising:
   one or more processors; and
   a memory containing instructions thereon which, when executed by the one or more processors, cause the processors to perform a set of actions comprising:
      identifying a set of case files that have been tagged as complete, wherein the case files are associated with a case type;
      for each respective case file in the set, applying a natural-language-processing (NLP) technique, via a code module executed on a processor, to natural-language data included in the respective case file to generate a respective collection of structured data that represents information found in the respective case file;

detecting a pattern evinced by the respective collections of structured data, wherein the pattern involves a data type representing a first type of evidence for an incident described by one of the set of case files;

adding an indication of the pattern to a template associated with the case type;

detecting that an additional case file associated with the case type has not been tagged as complete;

applying the NLP technique to natural-language data included in the additional case file to generate an additional collection of structured data that represents information found in the additional case file;

comparing the additional collection of structured data to the template;

determining, based on the comparison, that the additional collection of structured data is inconsistent with the pattern with regard to a correlation between the data type and another data type representing a second type of evidence for the additional case file to support a criminal conviction; and transmitting an electronic notification to a user to suggest that data of the data type be added to the additional case file.

9. The system of claim 8, wherein detecting the pattern evinced by the respective collections of structured data comprises:

determining that a quantity of the respective collections of structured data includes data of the data type; and detecting that the quantity meets a predefined threshold.

10. The system of claim 8, wherein adding the indication of the pattern to the template associated with the case type comprises adding the data type to a list of data types for the template.

11. The system of claim 8, wherein determining, based on the comparison, that the additional collection of structured data with regard to the data type comprises detecting that the additional collection of structured data does not include data of the data type.

12. The system of claim 8, wherein detecting the pattern evinced by the respective collections of structured data comprises detecting a relationship between the data type and an additional data type, and wherein determining that the additional collection of structured data is inconsistent with the pattern comprises detecting that a relationship between a value of the data type in the collection of structured data and a value of the additional data type in the collection of structured data is inconsistent with the relationship between the data type and an additional data type.

13. The system of claim 8, wherein the set of actions further comprises:

receiving, from the user via an input/output (I/O) device in response to the electronic notification, feedback indicating that data of the data type should not be suggested for the additional case file; and in response to the feedback, removing the data type from a list of data types for the template.

14. The system of claim 8, wherein the set of actions further comprises:

receiving, from the user via an input/output (I/O) device, feedback suggesting that an additional data type be added to a list of data types for the template; and in response to receiving the feedback, adding the additional data type to the list of data types for the template.

15. A non-transitory computer-readable storage medium containing instructions that, when executed by one or more processors, perform a set of actions for an adaptive template system that facilitates case file sufficiency, the set of actions comprising:

identifying a set of case files that have been tagged as complete, wherein the case files are associated with a case type;

for each respective case file in the set of case files, applying a natural-language-processing (NLP) technique, via a code module executed on a processor, to natural-language data included in the respective case file to generate a respective collection of structured data that represents information found in the respective case file;

detecting a pattern evinced by the respective collections of structured data, wherein the pattern involves a data type representing a first type of evidence for an incident described by one of the set of case files;

adding an indication of the pattern to a template associated with the case type;

detecting that an additional case file associated with the case type has not been tagged as complete;

applying the NLP technique to natural-language data included in the additional case file to generate an additional collection of structured data that represents information found in the additional case file;

comparing the additional collection of structured data to the template;

determining, based on the comparison, that the additional collection of structured data is inconsistent with the pattern with regard to a correlation between the data type and another data type representing a second type of evidence for the additional case file to support a criminal conviction; and transmitting an electronic notification to a user to suggest that data of the data type be added to the additional case file.

16. The non-transitory computer-readable storage medium of claim 15, wherein the set of actions further comprises:

determining that a quantity of the respective collections of structured data includes data of the data type; and detecting that the quantity meets a predefined threshold.

17. The non-transitory computer-readable storage medium of claim 15, wherein adding the indication of the pattern to the template associated with the case type comprises adding the data type to a list of data types for the template.

18. The non-transitory computer-readable storage medium of claim 15, wherein determining, based on the comparison, that the additional collection of structured data with regard to the data type comprises detecting that the additional collection of structured data does not include data of the data type.

19. The non-transitory computer-readable storage medium of claim 15, wherein detecting the pattern evinced by the respective collections of structured data comprises detecting a relationship between the data type and an additional data type, and wherein determining that the additional collection of structured data is inconsistent with the pattern comprises detecting that a relationship between a value of the data type in the collection of structured data and a value of the additional data type in the collection of structured data is inconsistent with the relationship between the data type and an additional data type.

20. The non-transitory computer-readable storage medium of claim 15, wherein the set of actions further comprises:
- receiving, from the user via an input/output (I/O) device in response to the electronic notification, feedback indicating that data of the data type should not be suggested for the additional case file; and
- in response to the feedback, removing the data type from a list of data types for the template.

\* \* \* \* \*